United States Patent Office 3,549,570
Patented Dec. 22, 1970

3,549,570
COPOLYCARBONATES
Arthur J. Coury, Minneapolis, Minn., assignor to General Mills, Inc., a corporation of Delaware
No Drawing. Filed Feb. 5, 1969, Ser. No. 796,899
Int. Cl. C08g *17/13*
U.S. Cl. 260—18
9 Claims

ABSTRACT OF THE DISCLOSURE

Copolycarbonates are prepared from dihydroxy-diaryl compounds and alkylene glycol esters and polyesters of dimeric fat acids. Various of these copolycarbonates find use as flexible packaging materials, as adhesives, and as molded articles.

---

The present invention relates to new polymer compositions, and more specifically to certain novel copolycarbonates of dihydroxy-diaryl compounds and alkylene glycol esters and polyesters of dimeric fat acids. These esters and polyesters are prepared from dimeric fat acids having 32 to 44 carbon atoms.

It is well known that various dihydroxy-diaryl compounds may be used in the preparation of polycarbonate polymers of high molecular weight which are industrially useful. Particularly, dihydroxy-diarylalkanes are so used. Many of such polymers however, have a tendency to exhibit the phenomenon of stress cracking. The term "stress cracking" describes the many small surface fractures of the molded polymer which appear, particularly in the presence of various semi-solvents, in the direction perpendicular to the axis of stress applied to such article. Stress cracking thus may tend to weaken the article and tend also to cloud what may formerly have been a clear and transparent composition.

I have now discovered that highly useful new polycarbonate polymers may be prepared from dihydroxy-diaryl compounds and alkylene glycol esters and polyesters of dimeric fat acids. Various polymers of this invention are readily molded, and the resulting molded articles which are prepared from about 30% to 50% (weight basis) polyesters of the dimeric fat acids, and correspondingly about 70% to 50% of the diaryl compounds, show significant reductions in stress cracking when compared to similar polycarbonate articles prepared from the diaryl compounds alone.

Where the new polymer is prepared from about 50% to 70% (weight basis) of the polyesters, and correspondingly about 50% to 30% of the diaryl compounds, the stress cracking is also greatly reduced. The tensile modulus of elasticity from these compositions is reduced too, such that flexible films suitable for wrapping, packaging or covering various objects may be prepared therefrom.

An additional improvement found for the new polycarbonates prepared from about 10% to 70% (weight basis) polyesters of the dimeric fat acids, and correspondingly 90% to 30% of the dihydroxy-diaryl compounds (as compared to polycarbonates which are 100% diaryl compounds) is significantly decreased water absorption, for example when samples of the copolycarbonates are immersed in water for twenty-four hour periods. These copolycarbonates also exhibit good thermal properties, e.g. Vicat softening point (A.S.T.M. D1525–58T).

The copolycarbonates of this inventtion prepared from about 10% to 70% (weight basis) alkylene glycol esters of the dimeric fat acids and correspondingly 90% to 30% dihydroxydiaryl compounds, have good tensile shear characteristics, for example when tested with chrome treated steel and with sand blasted steel. Thus such polymers may find use as adhesives.

It is an object of this inventtion to provide such new polymeric compositions. This and other objectives will become apparent from the following description.

The alkylene glycol esters and polyesters of dimeric fat acids used in this invention are prepared from polymerized ethylenically unsaturated monobasic carboxylic acids having 16 to 22 carbon atoms or the lower alkyl esters thereof. The preferred aliphatic acids are the mono and polyolefinically unsaturated 18 carbon atom acids. Representative octadecenoic acids are 4-octadecenoic, 5-ocetadecenoic, 6-octadecenoic (petroselinic), 7-octadecenoic, 8-octadecenoic, cis-9-octadecenoic (oleic), trans-9-octadecenoic (elaidic), 11-octadecenoic (vaccenic), 12-octadecenoic and the like. Representative octadecadienoic acids are 9,12-octadecadienoic (linoleic), 9,11-octadecadienoic, 10,12-octadecadienoic, 12,15-octadecadienoic and the like. Representative octadecatrienoic acids are 9,12,15-octadecatrienoic (linolenic), 6,9,12-octadecatrienoic, 9,11,13-octadecatrienoic (eleostearic), 10,12, 14-octadecatrienoic (pseudoeleostearic) and the like. A representative 18 carbon atom acid having more than three double bonds is moroctic acid which is indicated to be 4,8,12,15-octadecatetraienoic acid. Representative of the less preferred (not as readily available commercially) acids are: 7-hexadecenoic, 9-hexadecenoic (palmitoleic), 9-eicosenoic (gadoleic), 11-eicosenoic, 6,10,14-hexadecatrienoic (hiragonic), 4,8,12,16-eicosatetraenoic, 4,8,12,15,18-eicosatpentanoic (timnodonic), 13-docosenoic (erucic), 11-docosenoic (cetoleic), and the like.

The ethylenically unsaturated acids can be polymerized using known catalytic or non-catalytic polymerization techniques. With the use of heat alone, the mono-olefinic acids (or the esters thereof) are polymerized at a very slow rate while the polyolefinic acids (or the esters thereof) are polymerized at a reasonable rate. If the double bonds of the polyolefinic acids are in conjugated positions, the polymerization is more rapid than when they are in the non-conjugated positions. Clay catalysts are commonly used to accelerate the dimerization of the unsaturated acids. Lower temperatures are generally used when a catalyst is employed.

The polymerization of the described ethylenically unsaturated acids yields relatively complex products which usually contain a predominant portion of dimerized acids, a smaller quantity of trimerized and higher polymeric acids and some residual monomers. The dimerized acids having 32 to 44 carbon atoms can be obtained in reasonably high purity from the polymerization products by vacuum distillation at low pressures, solvent extraction or other known separation procedures. The polymerization product varies somewhat depending on the starting fat acid or mixture thereof and the polymerization technique employed—i.e. thermal, catalytic, particular catalyst, conditions of pressure, temperature etc. Likewise, the nature of the dimerized acids separated from the polymerization product also depends somewhat on these factors although such acids are 'functionally similar.

Analysis of dimerized acids prepared from linoleic acid rich starting materials using heat alone or heat plus a catalyst, such as an acid or alkaline clay, shows that the product contains structurally similar acids having monocyclic tetra-substituted ring structures as well as acids with two and three rings, such additional rings generally being fused to the six carbon atom ring. The clay catalyzed dimerized acids have been shown to contain some aromatic rings according to ultraviolet and infrared spectroscopy. These aromatic rings are believed to be formed by hydrogen transfer (by catalytic action of clay) from a substituted cyclohexene ring to form a substituted benzene ring. Polymerization of pure oleic acid using a clay catalyst has been shown to yield a mixture of dimerized fat acids of which approximately 25–30% by weight have a one ring cyclic structure with the remainder being non-cyclic. However, when mixtures of oleic and linoleic acids (such as from tall oil) are polymerized, the resulting dimerized fat acid contains little if any dimer having a non-cyclic structure.

It is apparent from the above and other published analyses that the polymerization of the ethylenically unsaturated acids yield complex products. The dimer fraction thereof generally consisting of a mixture of acids, can be assigned the formula:

HOOC—D—COOH where D is a divalent hydrocarbon group containing 30 to 42 carbon atoms. It is also apparent that said divalent hydrocarbon group is complex since a mixture of acids normally results from the polymerization and subsequent fractionation. These acids have structural and functional similarities. Thus such mixture of acids contains a significant proportion of acids having a six carbon atom ring (about 25% or more even when the starting fat acid is a mono-olefinically unsaturated acid such as oleic). The remaining carbon atoms in the divalent hydrocarbon group of such ring containing acids are then divided between divalent and monovalent radicals which may be saturated or ethylenically unsaturated. Such radicals may form one or more additional cyclic structures which are generally fused to the first six membered ring. Many of such dimeric acids may be considered as having a theoretical idealized, general formula as follows:

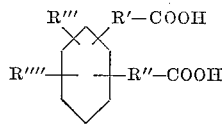

where R' and R'' are divalent hydrocarbon radicals, R''' and R'''' are monovalent hydrocarbon radicals and the sum of the carbon atoms in R'-R'''' is 24–36. The ring may be saturated or it may contain one to three double bonds depending on the specific starting material, polymerization conditions and subsequent treatment including hydrogenation. It is also understood that the R'-R'''' radicals may form one or more additional cyclic structures which are generally fused to the first ring.

As a practical matter, the dimeric fat acids are preferably prepared by the polymerization of mixtures of acids (or the simple aliphatic alcohol esters—i.e. the methyl esters) derived from the naturally occurring drying and semi-drying oils or similar materials. Suitable drying or semi-drying oils include soybean, linseed, tung, perilla, oiticia, cottonseed, corn, sunflower, dehydrated castor oil and the like. Also, the most readily available acid is linoleic or mixtures of the same with oleic, linolenic and the like. Thus, it is preferred to use as the starting materials, mixtures which are rich in linoleic acid. An especially preferred material is the mixture of acids obtained from tall oil which mixture is composed of approximately 40–45% linoleic and 50–55% oleic. It is also preferred to carry out the polymerization in the presence of a clay. Partial analysis of a relatively pure dimer fraction (98.5% dimer) obtained from the product prepared by polymerizing the tall oil fatty acids in the presence of 10% by weight of an alkaline montmorillonite clay at a temperature of 230° C. and a pressure of 140 p.s.i. for five hours showed that it was a mixture of $C_{36}$ acids, the major proportion thereof being monocyclic of the above general formula with a substantial amount of the acids having a ring containing three double bonds (aromatic) and saturated side chains. Such mixture of acids was used in the preparation of the alkylene glycol esters and polyesters used in this invention with the dihydroxy-diaryl compounds to form the new polycarbonates. It is also to be understood that the corresponding hydrogenated dimeric fat acids are useful in preparing the esters and polyesters, and thus ultimately the copolycarbonates, of this invention.

The dimeric fat acids are reacted with various alkylene glycols to form hydroxy terminated esters and polyesters of such fat acids. Alkylene glycols containing two to six or more carbon atoms, and including ethylene glycol and various propylene glycols, butylene glycols, pentylene glycols and hexylene glycols, may be used to prepare the alkylene glycol esters and polyesters of the dimeric fat acids used in this invention. The examples A through D below illustrate a method of preparing such esters and polyesters. In this conventional method, dimeric fat acid mixtures described above are heated with alkylene glycols to temperatures between about 170° C. to 220° C. or more, under a nitrogen atmosphere, while water produced by the esterification reaction is removed from the reaction flask or vessel. The reaction takes several hours or more, and is essentially complete when the amount of water removed is nearly that which is calculated to be produced from a stoichiometric balance for the reaction, or when the measured acid value for the mixture can no longer be reduced by further heating. Where it is desired to produce the lower oligomeric ester, reactants are used with a large excess of the glycol; the heating is to a lower temperature than for the polyester preparation; and excess glycol is separated from the higher molecular weight ester by a wiped film still. Where it is desired to obtain the polyester, a much small excess of the glycol is used in the reactants. It may be desirable to speed up the reaction in forming the polyesters by the aid of a catalyst such as dibutyltin oxide.

The esters and polyesters of the dimeric fat acids are dihydroxy terminated and are of the general structural formula

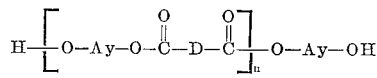

where Ay is the alkylene radical of the alkylene glycol, and $n$ indicates the average number of repeating units in the polyester and may be an integer from about 1 to 10. Where the product formed is the diester of a dimeric fat acid, $n$ is 1. The average molecular weight for these esters and polyesters are found to be between about 600 and 10,000 or more. Molecular weights may be measured by the vapor pressure osmometer method, by end group analysis or by other common methods. The average molecular weight determined for the ester may be divided by the molecular weight of the repeating unit to approximate $n$. The $n$ for the ester or polyester of the above general structural formula may also be described as being between 1 and such average number of repeating units which will result in an inherent viscosity of up to about 0.3 for the ester (measured in o-chlorophenol at 30° C.).

EXAMPLE A

To a 5 liter 3-necked flask, equipped with a thermocouple, stirrer and a Vigreux distilling column were added 1140 g. hydrogenated dimeric fat acid mixture as described above and 2200 g. ethylene glycol. The mixture was stirred and was heated under nitrogen to 175° C. This temperature was maintained for 16 hours and was then increased to 195° C. for 25 hours. By this time a low acid value (5 meq. per kg.) was obtained for the mixture. The mixture was stripped under vacuum to remove the excess glycol, and was distilled in a wiped film still to provide 685 g. (52% yield) of the dihydroxy terminated ethyl esters of the dimeric fat acids. The molecular weight of the product was determined by end group analysis to be 660. The product was a clear viscous liquid, and had the general structural formula indicated above, where $n$ is one, and where Ay is $C_2H_4$.

EXAMPLE B

To a glass, 1 liter polymer reactor equipped with a sealed stirrer (for vacuum operation), thermocouple and Vigreux distilling column was added 285.0 g. hydrogenated dimeric fat acid mixture as described above, and 68.2 ethylene glycol. The stirred reaction mixture was heated under nitrogen at 200°–245° C. for 3.5 hours while water from the reaction was distilled off. A water aspirator vacuum was applied to the reaction mixture at 10 mm. Hg and 245° C. for thirty minutes. The resulting polyester product was allowed to cool under nitrogen to room temperature. By vapor pressure osmometer measurements it was determined that the molecular weight of the product, the ethylene glycol polyester of the dimeric fat acids, was 5750; in the general structural formula above, Ay was an ethylene radical, and the inherent viscosity of the polyester was 0.23 (0.5 g. per 100 ml. o-chlorophenol solution at 30° C.).

EXAMPLE C

To a glass reaction vessel equipped with a stirrer, condenser, thermocouple and a distillate receiver were added 285 g. hydrogenated dimeric fat acid mixture as described above, 104.2 g. neopentyl glycol and 0.41 g. dibutyltin oxide as a catalyst. The reactants and catalyst were heated with stirring under nitrogen to 190°–220° C. for 6.5 hours while water from the reaction was distilled off. The resulting reaction product was allowed to cool to room temperature while a vacuum aspirator was applied to remove any remaining water. The molecular weight of the product, the neopentyl glycol polyester of the dimeric fat acids, was determined by end group analysis to be 3,920. The inherent viscosity of the polyester was found to be 0.16 (0.5 g. per 100 ml. o-chlorophenol solution at 30° C.).

EXAMPLE D

To a glass reaction vessel equipped with a stirrer, condenser, thermocouple and distillate receiver were added 285 g. hydrogenated dimeric fat acid mixture as described above 90.12 g. 1,4 butanediol and 0.41 g. dibutyltin oxide as a catalyst. The resulting mixture was heated with stirring under nitrogen to a temperature of 190° to 220° C. for 6 hours while water vapor was removed from the reaction vessel by distillation. The product formed, the 1,4 butanediol polyester of the dimer fat acids, was allowed to cool under reduced pressure to room temperature. The molecular weight of the product, as determined by end group analysis was 3,020. The inherent viscosity of the polyester was found to be 0.14 (0.5 g. per 100 ml. o-chlorophenol solution at 30° C.)

These hydroxyl terminated alkylene glycol esters and polyesters of the dimer fat acids are combined with a variety of dihydroxy-diaryl compounds to yield the copolycarbonates of my invention. Dihydroxy-diaryl alkanes of this class of compounds may be represented by the general formula:

HO—(Ar)—R*—(Ar)—OH where Ar is an aryl group and R* is a divalent substituted or unsubstituted saturated aliphatic hydrocarbon group. Representative of R* are methylene, ethylene, propylene, butylene, pentylene, hexylene, heptylene, octylene, nonylene and substituted groups such as phenylmethylene and the like. Representative of the dihydroxy-diarylalkanes of this general formula are:

4,4′-dihydroxy-diphenylmethane,
4,4′-dihydroxy-diphenyl-1,1-ethane,
4,4′-dihydroxy-diphenyl-1,1-propane,
4,4′-dihydroxy-diphenyl-1,1-butane,
4,4′-dihydroxy-diphenyl-1,1-(2-methylpropane),
4,4′-dihydroxy-diphenyl-1,1-heptane,
4,4′-dihydroxy-diphenyl-1,1-(2methylbutane),
4,4′-dihydroxy-diphenyl-1,1-(1-phenylmethane),
4,4′-dihydroxy-diphenyl-2,2-propane,
4,4′-dihydroxy-diphenyl-2,2-butane,
4,4′-dihydroxy-diphenyl-2,2-pentane,
4,4′-dihydroxy-diphenyl-2,2-(4-methylpentane),
4,4′-dihydroxy-diphenyl-2,2-heptane,
4,4′-dihydroxy-diphenyl-2,2-octane,
4,4′-dihydroxy-diphenyl-2,2-nonane,
4,4′-dihydroxy-diphenyl-3,3-pentane,
4,4′-dihydroxy-diphenyl-4,4-heptane,
4,4′-dihydroxy-diphenyl-1,1-cyclohexane,
4,4′-dihydroxy-3,3′-dicyclohexyl-diphenyl-2,2-propane,
4,4′-dihydroxy-3-methyl-diphenyl-2,2-propane,
4,4′-dihydroxy-3-isopropyl-diphenyl-2,2-butane,
4,4′-dihydroxy-3,3′-dibutyl-diphenyl-2,2-propane,
4,4′-dihydroxy-2,2′-dimethyl-diphenyl-2,2-propane,
4,4′-dihydroxy-3,3′-dimethyl-6,6′-dibutyl-diphenyl-1,1-butane,
4,4′-dihydroxy-3,3′-dimethyl-6,6′-di-tert.butyl-diphenyl-1,1-propane,
4,4′-dihydroxy-3,3′-dimethyl-6,6′-di-tert.butyl-diphenyl-1,1-(1-phenyl-methane),
4,4′-dihydroxy-3,3′-dimethyl-6,6′-di-tert.butyl-diphenyl-1,1-(2-methyl-pentane),
4,4′-dihydroxy-diphenyl-4-methyl-phenylmethane, and
4,4′-dihydroxy-diphenyl-4-isopropyl-phenylmethane.

Among the suitable dihydroxy-diarylalkanes suggested in the above non-exhaustive list, the preferred compositions are from a group comprised of structures where Ar is a benzene radical, R* is an alkylene radical of one to five carbon atoms, and the hydroxy groups are in para positions. Particularly preferred is 4,4′-dihydroxy-diphenyl-2,2-propane.

In addition to the dihydroxy-diarylalkanes suggested above, dihydroxy-diarylsulphones and dihydroxy-diarylethers may also be used. In such instances R* of the generalized formula above would be

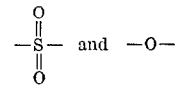

respectively. Representative of compounds of these classes are:

4,4′-dihydroxy-diphenylsulphone,
3,3′-dihydroxy-diphenylsulfone,
4,4′-dihydroxy-2,2′-dimethyl-diphenylsulfone,
2,2′-dihydroxy-4,4′-dimethyl-diphenylsulfone,
4,4′-dihydroxy-3,3′-diethyl-diphenylsulfone,
4,4′-dihydroxy-3,3′-di-tert.butyl-diphenylsulfone,
4,4′-dihydroxy-diphenylether,
4,4′-dihydroxy-2,2′-dimethyl-diphenylether,
2,2′-dihydroxy-4,4′-dimethyl-diphenylether, and
4,4′-dihydroxy-3,3′-diethyl-diphenylether.

The copolycarbonate polymers of my invention are preferably prepared by condensing the dihydroxy-diaryl compounds and the hydroxy terminated esters and polyesters of the dimeric fat acids with phosgene. Such phosgenation can be carried out using conventional techniques. See Schnell, Chemistry and Physics of Polycarbonates, ch. III (1964), for a general discussion of the preparation of polycarbonates by phosgenation.

Phosgenation proceeds when phosgene is introduced to a solution of the reactants in organic bases such as trimethylamine, pyridine and diethylaniline, or in inert (with respect to the compositions present in this class of reactions) organic solvents such as methylene chloride, ligroin, chloroform, benzene, hexane and carbon tetrachloride, with addition of an acid-binding agent such as a tertiary amine. Preferred phosgenation reactions employ the solution in pyridine, or in methylene chloride with the addition of a small amount of pyridine. It is also preferred to react the phosgene with a mixture of the two dihydroxy reactants, although good results may also be obtained by first reacting the dihydroxy-diaryl compounds with the phosgene and then adding the hydroxy terminated ester of the dimeric fat acid and continuing the reaction.

The new polycarbonates may be represented in the following idealized general structural formula:

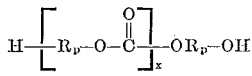

In this formula, $x$ is an integer representing the number of recurring structural units in the polymer. $R_p$ is used to represent the recurring diaryl units and the esters of the dimeric fat acid units as they appear in combined form in the copolycarbonate. Thus $R_p$ is representative of a structure:

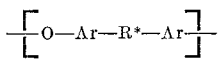

or

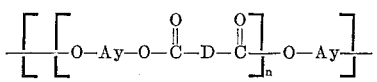

The molecular weight of the copolycarbonate is such that the inherent viscosity of 0.5 g. per 100 ml. of solution of the copolycarbonate in methylene chloride at 25° is at least about 0.4. Brittleness is a characteristic of the copolycarbonates, and of other polymers, where the inherent viscosity is too low. When the inherent voscosity is very high, e.g. 2.5, the copolycarbonate reaction mixtures and melts become extremely viscous and may be difficult to process.

Alternative to the idealized general structural formula given for the new copolycarbonates, these compounds may be described as copolycarbonate polymers containing up to specified percents of recurring structural units A and B (as to be described herein), wherein these units in the polymer are connected through the oxy group of one unit and the carbonyl group of a second unit, and wherein the inherent viscosity of the polymers is about 0.4 or greater. Accordingly, the recurring structural units A and B are described as follows:

(A) 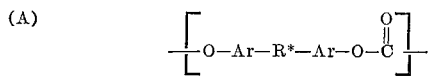

or (B) 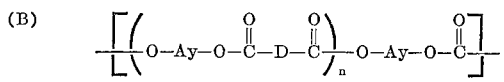

wherein Ar, R*, Ay, D and $n$ are defined in the same manner as earlier in this description. The copolycarbonates of this invention contain 10 to 70 weight percent of recurring unit B, the remainder being recurring unit A.

The following specific examples are intended to illustrate more fully the nature of the invention, but are not to be construed as a limitation on the scope thereof.

EXAMPLE I

Phospene was bubbled into a stirred solution of 45 g. (0.137 eq.) of bis-ethylene glycol ester of dimeric fat acid prepared in Example A, 105 g. (0.91 eq.) bisphenol A and 125 g. pyridine in 500 ml. methylene chloride at a rate of 0.1 to 1.0 g./min. for an hour, followed by continued addition at a rate of 0.3 g./min. for 35 minutes. During this introduction of phosgene the mixture was maintained at 20° to 25° C. by external cooling. After about 80 minutes, the mixture became thicker, and 250 ml. methylene chloride was added to reduce viscosity. The mixture assumed a yellow-orange color as the end point of the reaction was reached. After the phosgene introduction was completed, the mixture was shaken with 1000 ml. 10% by (weight/volume) sulfuric acid. The resulting organic solution was washed twice with water (emulsion started to develop) then with several portions of isopropyl alcohol-water mixtures until the aqueous solution was neutral to universal pH paper. The product was precipitated from solution with isopropyl alcohol in a Waring Blendor, removed by filtration, partially air dried, and then dried to a constant weight (155 g.) in a vacuum oven at 120° C. A sheet having a thickness of about 0.040 in. was compression molded at 210° C. The molded polycarbonate had the following properties: tensile ultimate of 7,200 p.s.i. (A.S.T.M. D1708–59T); yield stress of 6,950 p.s.i. (A.S.T.M. D1708–59T); percent elongation of 135 to 154 (A.S.T.M. D1708–59T); and tensile modulus of elasticity of 215,000 using A.S.T.M. test procedure D638–61T on a specimen made from die C of A.S.T.M. D412–62T. The tensile shear of the molded product was 2,530 p.s.i. on chrome-treated steel (A.S.T.M. D1002–64) and the tensile peel on the same substrate was 7.7 lb./in.; this compares to 723 p.s.i. and 7.0 lb./in. respectively for similar polycarbonate samples made from bisphenol A alone. The product had an inherent viscosity in methylene chloride at 25° C. (0.5 g./100 ml. of solution) of 1.02. The product had the general formula set forth hereinabove, with Ar being benzene, R* being a 2,2'-substituted propylene radical, Ay being a 1,2-substituted ethylene radical and $n$ being 1.

EXAMPLE II

Phosgene was bubbled into a refluxing solution consisting of 70 g. bisphenol A, 30 g. ethylene glycol polyester of dimeric fat acid prepared as in Example B, 73 g. pyridine and 500 ml. methylene chloride. The rate of phosgene addition was 1 g./min. for 33 minutes, and 0.3 g./min. for 12 minutes. After about 30 minutes of the phosgene addition, pyridine hydrochloride had begun to precipitate, and the formation of a yellow hue in the mixture indicated the end point was being reached. The mixture was shaken (after the phosgene addition was completed) with 625 g. of 10% sulfuric acid. The aqueous phase was separated and the organic solution remaining was washed successively with water, 3 portions of an isopropyl alcohol-water mixture, and a final portion of water. The polymer was recovered by solvent stripping followed by vacuum drying at 120° C. The product weighed 94 g. A compression molded sheet (215° C.) of the product had the following properties (determined by standard testing procedures used in Example I): tensile ultimate 3,750 p.s.i., yield stress 4,300 p.s.i., percent elongation 75–89, and tensile modulus of elasticity 104,000 p.s.i. The product had an inherent viscosity in methylene chloride at 25° C. (0.5 g. per 100 ml. solution) of 0.79, and in the general structural formula given above, Ar was benzene, R* was a 2,2'-substituted propylene radical, and Ay was a 1,2-substituted ethylene radical.

EXAMPLE III

Phosgene was added at a rate of 0.8 to 1.0 g./min. into a stirred solution of 135 g. bisphenol A, 15 g. ethylene glycol polyester of dimeric fat acid prepared as in Example B, and 149 g. pyridine in 750 ml. methylene chloride. The temperature of the solution was maintained below 30° C. by cooling. When 35 g. phosgene had been added to the solution, pyridine hydrochloride began to precipitate. The mixture thickened considerably by the time 60 g. phosgene had been bubbled into the solution. An additional 500 ml. methylene chloride was added to the mixture at this point, and the rate of phosgene addition was reduced to 0.4 to 0.5 g./min. The phosgene addition was stopped when a total of 64.5 g. phosgene had been added; at this point, a yellow hue in the solution indicated the end point had been reached. The resulting mixture was washed successively, shaken with 950 g. 10% sulfuric acid, water, and six portions of an isopropyl alcohol-water mixture. The mixture was then stripped of solvent and the residue dried in vacuum at 90° C. A portion of the product was compression molded; it had the following properties: tensile ultimate 6,800 p.s.i., yield stress 8,300 p.s.i., percent elongation 57, and tensile modulus of elasticity 216,000 p.s.i. The Vicat softening point of the product was 150° C. These properties were measured by the same tests used in previous examples.

The product had the general formula set forth hereinabove, with Ar being benzene, R* being a 2,2'-substituted propylene radical and Ay being a 1,2-substituted ethylene radical. The inherent viscosity of a 0.5 g./100 ml. solution in methylene chloride at 25° C. was 1.21.

EXAMPLE IV

Phosgene was added (by bubbling) to a stirring solution of 30 g. bisphenol A, 70 g. ethylene glycol polyester of dimeric fat acids as prepared in Example B, and 36 g. pyridine in 500 ml. methylene chloride. The phosgene was added at a rate of 0.8 g./min. for 10 minutes, and then at a rate of 0.2 to 0.3 g./min. for 50 minutes. The stirred solution was maintained at a temperature of 25–27° C. by water cooling. When 15 g. phosgene had been added, pyridine hydrochloride began to precipitate. When 18 g. phosgene had been added, the mixture assumed a yellow hue, and the phosgene addition was stopped. The mixture was poured into 130 g. of 10% sulfuric acid, and was washed successively with two portions of water and then five portions of isopropyl-alcohol-water. The resulting solution was concentrated and the product was precipitated therefrom with isopropyl alcohol. The yield of dried product was 95 g. The inherent viscosity of the product (0.5 g./100 ml. methylene chloride solution) at 25° C. was 0.61. The product was a copolycarbonate with the general formula set forth hereinabove, with Ar being benzene, R* being a 2,2'-substituted propylene radical and Ay being a 1,2-substituted ethylene radical.

EXAMPLE V

Phosgene was bubbled into a stirred solution of 75 g. bisphenol A, 75 g. neopentyl glycol polyester of dimeric fat acids prepared in Example C, and 81 g. pyridine in 750 ml. methylene chloride. The phosgene addition rate was 0.9 to 1.0 g./min. for 34 minutes; then reduced to a rate of 0.2 to 0.3 g./min. The stirred solution was maintained at 25–30° C. by a water bath. When 34.5 g. phosgene had been added, 250 g. methylene chloride was added to reduce viscosity. The reaction was complete when about 38.5 g. phosgene had been added. The resulting mixture was washed successively with 625 g. 10% sulfuric acid, water, and 5 portions of an isopropyl alcohol-water mixture. The solution was concentrated and the product was precipitated with isopropyl alcohol. The product was partially air dried, and then dried in a vacuum oven to a constant weight of 149 g. The inherent viscosity of the product in a 0.5 g./100 ml. of solution in methylene chloride at 25° C. was 0.91. The product was a copolycarbonate with the general formula set forth hereinabove, with Ar being benzene, R* being a 2,2'-substituted propylene radical, Ay being a 2,2-dimethyl-1,3-substituted propylene radical, and $n$ being 1. A portion of the product was compression molded and was found to have the following properties (as measured by tests used in Example I): tensile ultimate 4,000 p.s.i. yield stress 1,800 p.s.i., percent elongation 195, and tensile modulus of elasticity 30,000. The Vicat softening point was found to be 98° C.

EXAMPLE VI

Phosgene was bubbled into a stirred solution of 75 g. bisphenol A, 75 g. 1,4-butanediol polyester produced in Example D, and 110 g. pyridine in 750 ml. methylene chloride at a rate of 0.8 to 1.0 g./min. for 40 minutes, while the temperature was maintained at 30–35° C. by water cooling. Pyridine hydrochloride began to precipitate within 35 minutes. When 37 g. phosgene had been added, the solution began to thicken; the rate of phosgene addition was then reduced to 0.2 g./min. and 250 ml. methylene chloride was added. When a total of 39 g. phosgene had been added, the mixture had taken on a pink-yellow hue, and the phosgene addition was stopped. The solution was shaken with 900 g. 10% sulfuric acid, and the organic phase which separated was washed with six portions of a water-ethanol mixture and was then concentrated on a steam bath. The product was precipitated from the concentrated, washed organic phase with isopropyl alcohol. Then the product was washed with isopropyl alcohol, partially air dried, and dried to constant weight (147 g.) in a vacuum oven. The product was a copolycarbonate with the general formula set forth hereinabove where Ar is benzene, R* is a 2,2'-substituted propylene radical, Ay is a 1,4-substituted butylene radical. A portion of the product was compression molded and was found to have the following properties (as measured by the tests used in Example I): tensile ultimate 4,250 p.s.i., yield stress 1,700, percent elongation 226, and tensile modulus of elasticity 41,000. The Vicat softening point was 86° C. The product had an inherent viscosity in methylene chloride at 25° C. (0.5 g. per 100 ml. solution) of 1.01.

EXAMPLE VII

A portion of each of the copolycarbonate products of Examples II–VI were tested for water absorption characteristics by the procedure of A.S.T.M. D570-63 for 24-hour periods. Long term tests for water absorption were also made for varying periods of weeks using the same procedure. The results are compared below with data for a bisphenol A polycarbonate which was tested under the same conditions.

| | 24 hour test, percent H₂O absorption | Long term test | |
|---|---|---|---|
| | | Period (weeks) | Percent H₂O absorption |
| Example II | 0.13 | 17 | 0.27 |
| Example III | 0.09 | 14 | 0.21 |
| Example IV | 0.07 | 13 | 0.22 |
| Example V | 0.05 | 6 | 0.14 |
| Example VI | 0.06 | 5 | 0.13 |
| Bisphenol A | 0.19 | 17 | 0.40 |

The embodiments of the invention in which an exclusive property or privilege is claimed are defined as follows:

1. A copolycarbonate polymer having the general formula

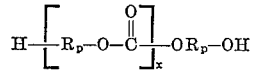

where $x$ is an integer representing the number of recurring structural units in the polymer, such integer being of a magnitude such that the inherent viscosity of a 0.5 g. per 100 ml. solution of the polymer in methylene chloride at 25° C. is at least about 0.4; where $R_p$ is a structure

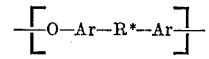

or

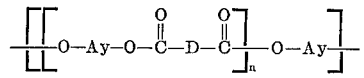

Ar being an aryl radical, R* being a divalent radical selected from a group consisting of a divalent saturated aliphatic hydrocarbon radical, an oxygen atom and a sulfur dioxide radical, Ay being a divalent alkylene radical containing 2 to 6 carbon atoms, D being the divalent hydrocarbon radical of a dimeric fat acid and containing 30 to 42 carbon atoms, $n$ being an integer from 1 to 10; and where

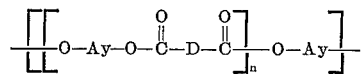

is present in an amount between about 10% and 70%, by weight, of the $R_p$ structures in the polymer.

2. The polymer of claim 1 wherein Ar is a benzene radical and R* is a divalent saturated aliphatic hydrocarbon radical of one to five carbon atoms.

3. The polymer of claim 2 wherein R* is a 2,2-substituted propylene radical.

4. The polymer of claim 1 wherein D contains 34 carbon atoms and is derived from dimerized fat acid obtained by polymerizing ethylenically unsaturated monocarboxylic acids of 18 carbon atoms, such acids comprising a mixture rich in linoleic acid.

5. The polymer of claim 1 wherein $n$ is 1.

6. The polymer of claim 1 wherein $n$ is 2 to 10.

7. The polymer of claim 6 wherein

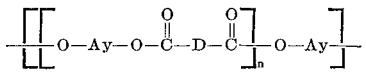

is present in an amount between about 30% to 50%, by weight, of the $R_p$ structures in the polymer.

8. The polymer of claim 6 wherein

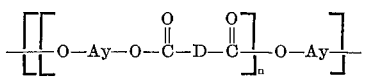

is present in an amount between about 50% to 70%, by weight, of the $R_p$ structures in the polymer.

9. The polymer of claim 1 wherein Ar is a benzene radical, R* is a 2,2-substituted propylene radical, D is the divalent hydrocarbon radical of dimerized fat acids obtained by polymerizing a mixture of ethylenically unsaturated monocarboxylic acids of 18 carbon atoms rich in linoleic acid.

References Cited

UNITED STATES PATENTS

| | | | |
|---|---|---|---|
| 3,287,442 | 11/1966 | Caldwell | 260—860X |
| 3,207,814 | 9/1965 | Goldberg | 260—47X |
| 3,000,849 | 9/1961 | Clachan | 260—47X |
| 2,429,219 | 10/1947 | Cowan | 260—22X |

DONALD E. CZAJA, Primary Examiner

C. W. IVY, Assistant Examiner

U.S. Cl. X.R.

260—22, 47, 860